United States Patent Office 3,679,656
Patented July 25, 1972

3,679,656
QUATERNIZED 1,2,4-TRIAZOLIUM-3-AZO DYESTUFFS
Masao Iizuka, Norio Igari, and Shigeo Maeda, Tokyo, Japan, assignors to Hodogaya Kagaku Kogyo Kabushiki Kaisha, Tokyo, Japan
Filed May 15, 1969, Ser. No. 824,774
Claims priority, application Japan, May 20, 1968, 43/33,539
Int. Cl. C09b 29/00, 29/34, 43/00
U.S. Cl. 260—157       11 Claims

ABSTRACT OF THE DISCLOSURE

Water-soluble quaternized cationic monoazo dyestuffs of the formula

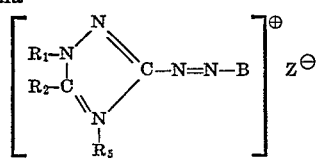

Figure 1:
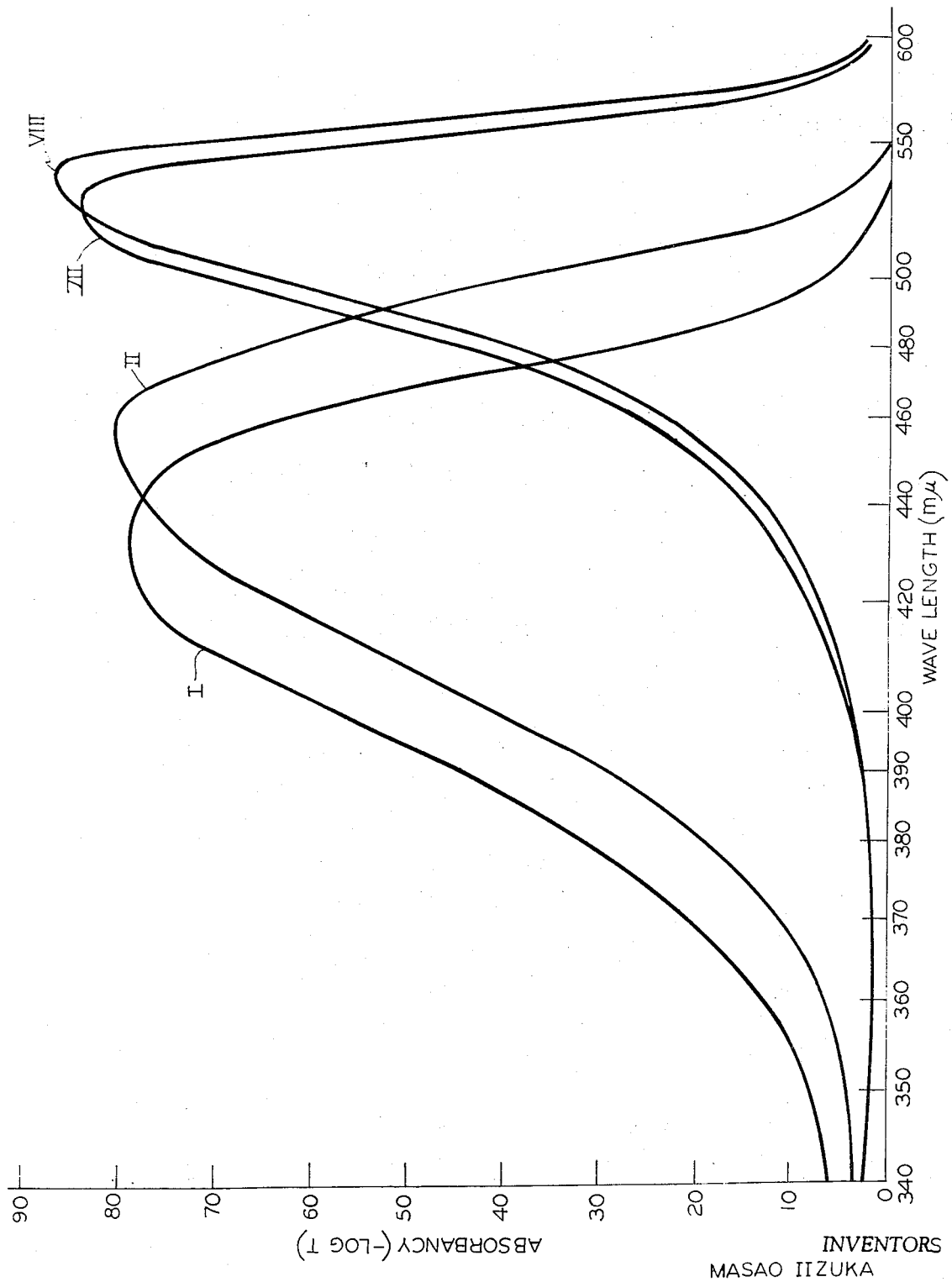

wherein B is a residue of a coupling component and $R_1$, $R_2$, $R_5$ and $Z^{\ominus}$ are the radicals individually defined in the specification and claims. The cationic monoazo dyestuffs are suitable for the dyeing of various materials such as paper, mordant-treated cellulose fibers, acetate fibers, silk, leather, polyester fibers and the like and especially for the dyeing of fibrous materials made of polyacrylonitrile or copolymers thereof. The dyeings in orange to reddish violet shades obtained with the new dyestuff possess an excellent fastness to light, washing and the like. The dyestuff is further characterized by the fact that the resulting dyeing can be more completely discharged by treatment with stannous chloride than the dyeings obtained by analogous dyestuffs hitherto known.

---

This invention relates to novel cationic azo dyestuffs and more particularly relates to novel quaternized cationic monoazo dyestuffs capable of dyeing various fibrous materials including natural and synthetic fibrous materials in full, dense and brilliant shades. The dyeings in orange to reddish violet shades thus obtained are characterized by their good fastness properties.

The novel cationic monoazo dyestuffs of the present invention are represented by the general formula

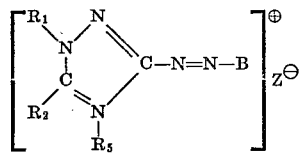  (1)

A basic monoazo dyestuff of the following formula:

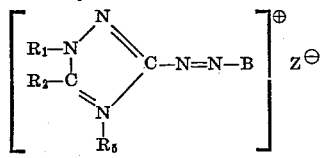

wherein $R_1$ is a member selected from the group consisting of lower alkyl, benzyl and phenyl, $R_2$ is hydrogen, lower alkyl, benzyl or phenyl; $R_5$ is a member selected from the group consisting of lower alkyl, benzyl, carbamoyl-ethyl, carbamoyl-isopropyl, lower alkoxy-ethyl and lower alkylcarbonylethyl, and B is a member selected from the group consisting of i)   (2)

wherein A is phenyl or naphthyl or phenyl substituted by a member selected from the group consisting of lower alkyl, lower alkoxy, meta-acetylamino and ortho- or meta-chlorine, and $R_3$ and $R_4$ are each a member selected from the group consisting of hydrogen, lower alkyl, beta-oxyethyl, beta-cyanoethyl, beta-chloroethyl, beta-methoxyethyl, beta-ethoxyethyl, benzyl, phenyl and 4-ethoxyphenyl;

ii) 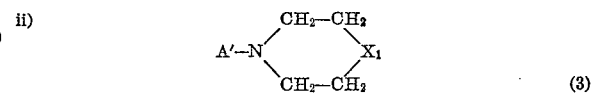  (3)

wherein A' is a phenyl and $X_1$ is a member selected from the group consisting of oxygen, imino and methylene;

iii) 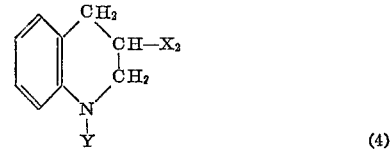  (4)

wherein Y is lower alkyl and $X_2$ is a member selected from the group consisting of hydrogen, hydroxy, methoxy and chlorine and iv) 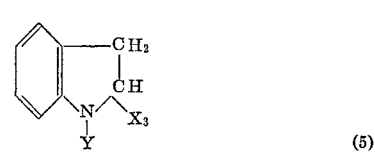  (5)

wherein Y is a member selected from the group consisting of lower alkyl and beta-cyanoethyl, $X_3$ is methyl and $Z^{\ominus}$ is an anion.

The above-defined cationic monoazo dyestuffs of the present invention may advantageously be prepared by quaternizing particular monoazo dyestuffs free from sulfonic and carboxylic radicals and represented by the formula

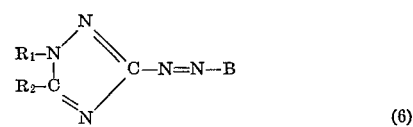  (6)

wherein $R_1$, $R_2$ and B have the same meanings as aforementioned, with a quaternizing agent according to the conventional procedure. There are thus obtained novel, water-soluble basic monoazo dyestuffs having excellent characteristics with respect to the shades of dyeing properties.

The quaternary ammonium monoazo dyestuffs of the present invention, as will be explained later in detail, are new triazol compounds having chemical structures wholly different from those of hitherto known basic monoazo dyestuffs derived from aminotriazol compounds.

It is surprising and wholly unexpected that the particular triazol monoazo dyestuff of the abovementioned general Formula 6 used as the starting material for the quaternization according to the present invention can be prepared by diazotizing an aminotriazol compound which contains a substituent at a definite nitrogen atom of said triazol ring and then coupling the resulting diazotized aminotriazol compound with an azo component capable of providing the residue B in the Formula 6. The said triazol monoazo dyestuff possesses a definite chemical structure leading to the formation of the quaternized ammonium compound having particular dyeing properties which are distinguished from those of known quaternized triazol-type basic azo dyestuffs.

The hitherto known quaternized triazol-type basic azo dyestuffs derived from known triazol azo dyestuffs are disclosed, for example, in the specifications of British Pat. Nos. 837,471 and 791,932. These known triazol-type monoazo dyestuffs had been prepared from unsubstituted 3-amino - 1,2,4 - triazol or 5-substituted 3-amino-1,2,4-triazol as diazo component. Nothing is, however, described in these British patent specifications with respect to the use of the tirazol amino compound containing a substituent at the nitrogen atom of the triazol ring as the diazo component. It is therefore uncertain which position of the triazol ring was actually substituted with the alkyl radical when the triazol monoazo dyestuff was quaternized with an alkylating agent.

On account of its characteristic chemical structure, a given triazol derivative may belong to anyone of the three probable tautomers (a), (b) and (c) in Group A of the schematic formulation given in the following Table I.

When these three isomers (a), (b) and (c) are respectively treated, for example, with one mole of benzyl chloride, there would be formed the three probable isomeric compounds represented by the Formulae d, e and f of Group B in Table I, each being substituted with one benzyl radical. When the isomers (d), (e) and (f) are further treated with an alkylating agent, that is, a quaternising agent, such as dimethyl sulfate, there might be formed six probable methyl derivatives having the Formulae g, h, i, j, k and l of Group C in Table I.

Under the circumstances, it is therefore uncertain which quaternary ammonium compound amongst the abovementioned six probable ones has been realized according to the known processes, inasmuch as it was not confirmed from which isomer of the three ones (d), (e) and (f) the known quaternized dyestuff was actually derived.

Since the intermediate triazol monoazo dyestuffs used for the quaternization according to the present invention, contrary to the known processes, are those derived from the diazo components having definite chemical structures such as 1-substituted 3-amino-1,2,4-triazol and 1,5-disubstituted 3-amino-1,2,4-triazol, it is decisive that said intermediate monoazo dyestuffs contain a substituent such as a benzyl radical at the position shown in the Formula e of Group B in Table I.

For the sake of comparison, the absorption spectra in the visible region of four benzyl-substituted intermediate triazol monoazo dyestuffs, two of which belong to those used for the process of the present invention and the remainders belong to those used for the known processes, are shown in Table II. Each of these intermediate monoazo dyestuffs are chromatographically identified as a simple substance.

TABLE I

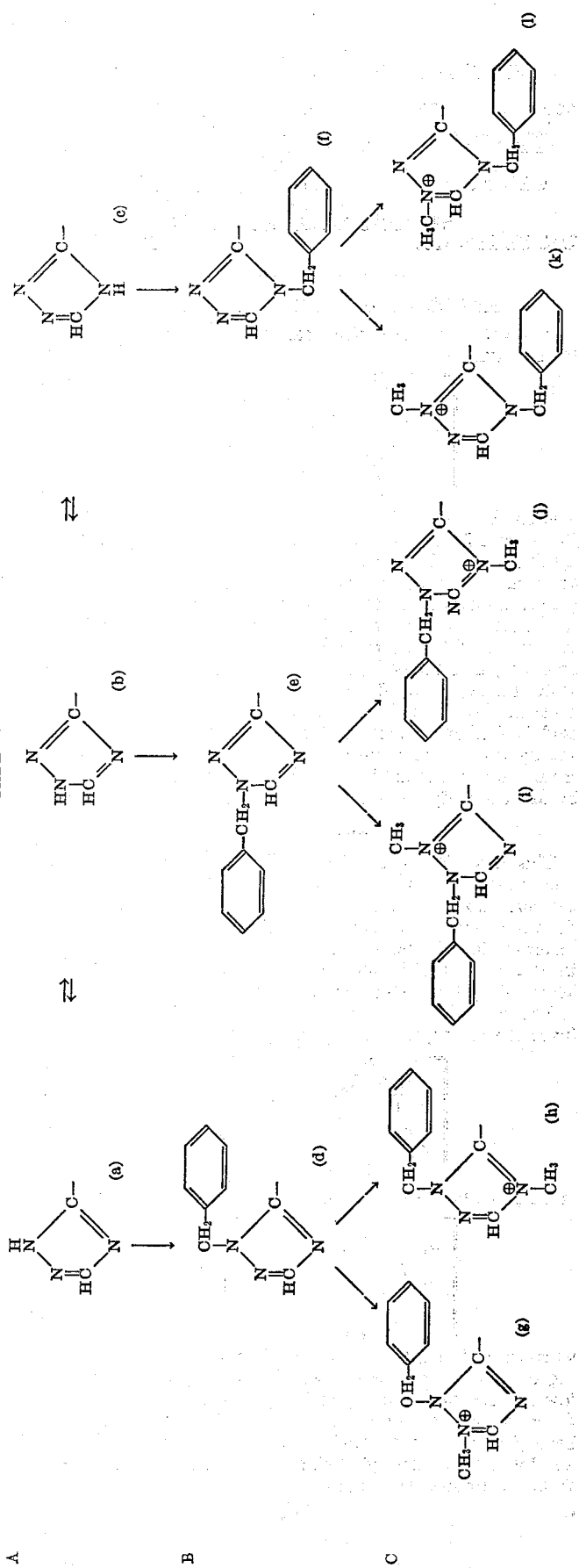

TABLE II

| Intermediate monoazo dyestuff used in present invention | Intermediate monoazo dyestuff used in known processes |
|---|---|
| Chemical formula: (I) benzyl-triazole azo compound with N(C₂H₅)₂ | Benzylation product (II) of a compound having the formula: (II) |
| λ Max. in pyridine.. 431 mμ | 458 mμ |
| Chemical formula: (III) benzyl-triazole azo compound with N(C₂H₅)(CH₂-phenyl) | Benzylation product (IV) of a compound having the formula: (IV) |
| λ Max. in pyridine.. 418 mμ | 450 mμ |

Figure 2:
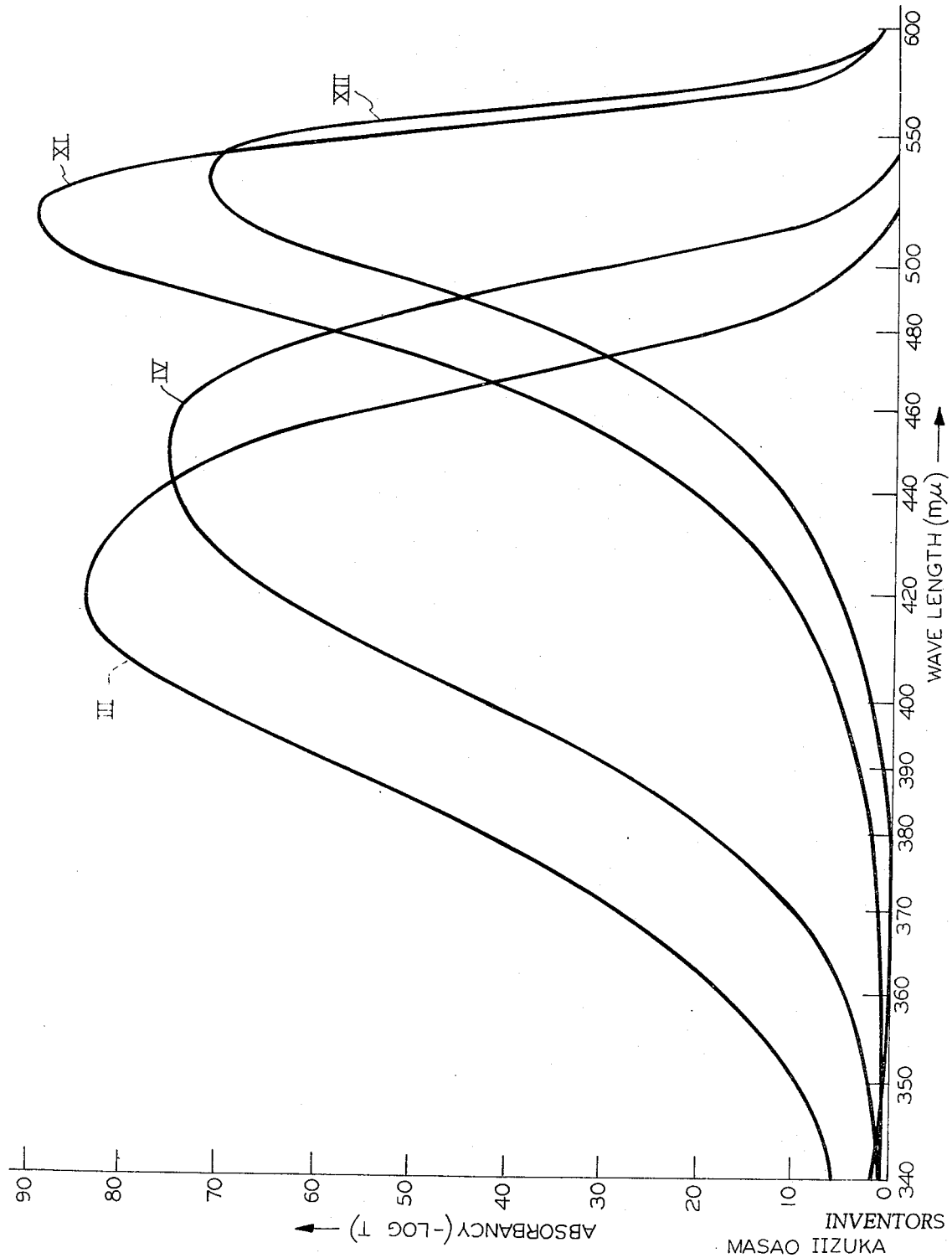

In the accompanying FIGS. 1 and 2, the absorption spectra in the visible region of the intermediate monoazo dyestffs and of the quaternary ammonium salts thereof according to the present invention are graphically shown in comparison with the absorption spectra of the corresponding intermediate monoazo dyestuffs and the quaternary ammonium salts thereof obtained by the known processes.

As is seen from Table II and the curves in FIGS. 1 and 2, the maximum absorption spectra of the compounds (I) and (III) to be used in the present invention, different from those of the compounds (II) and (IV) to be used in the known processes, shift toward the region of shorter wave lengths in continuous spectrum than those of the known compounds (II) and (IV). This fact proves that the chemical structures of the former two compounds differ from those of the latter two. It is therefore sure that the former compounds must have the structures falling in wtih the Formula e of Group B in Table I, while the latter compounds must have the structures falling in with either one of the Formulae d and f.

Similarly, the absorption spectra in the visible region of a few quaternary ammonium compounds (V), (VII), (IX) and (XI) obtained from the intermediate triazol monoazo dyestuffs according to the present invention and of the equivalent known ammonium compounds (VI), (VIII), (X) and (XII) obtained by the known processes are shown in Table III and FIGS. 1 and 2. These quaternary ammonium compounds weer also chromatographically identified as simple substances.

Here again, it is noted from Table III and FIGS. 1 and 2 that the maximum absorption wave length in the spectra of the quaternary ammonium compounds of the present invention, like those of the compounds (I) and (III) in Table II and in FIGS. 1 and 2, shift toward the region of shorter wave lengths in the continuous spectrum over the maximum absorption wave length in spectra of the afore-mentioned known quaternarized ammonium azo dyestuffs. The shades of the quaternarized ammonium azo dyestuffs according to the present invention on polyacrylonitrile fibres can also be distinguished from those of the known quaternarized ammonium azo dyestuffs. Again, these facts prove that there is a distinct difference between the chemical structures of these two groups of the dyestuffs. It is thus believed that the dyestuffs according to the present invention have chemical structures corresponding to the Formulae i and j of the Group C in Table I, whereas the known dyestuffs would have the chemical structure corresponding to anyone of the Formulae g, h, k and l.

Incidentally, it has been observed that the azo dyestuffs obtained starting from 2-benzyl-3-amino-1,2,4-triazol hydrochloride melting at 241° C. which had been prepared according to the teaching of the article of Shirakawa, the Journal of Japanese Pharmacological Society, 80, pp. 1550-6 (1960), unexceptionally show the same absorption spectra as those of the known azo dyestuffs. It is therefore surmised that the known intermediate azo dyestuff should probably have the Formula d of Group B in Table I, and furthermore the quaternary ammonium compound de-

TABLE III

| | Compounds of present invention | Compounds prepared by known processes |
|---|---|---|
| | Methylation Product (V) a compound having the formula: | Dimethylation Product (IV) of a compound having the formula: |
| Chemical formula | H₃C-N-triazole-C=N-N-phenyl-N(C₂H₅)₂ | H-N-triazole-C=N-N-phenyl-N(C₂H₅)₂ |
| λLmax. in water | 524 mμ | 538 mμ |
| Shade on polyacrylonitrile fibres | Red | Bluish red |
| Structural formula | Methylation Product (VII) of Compound (I) | Methylation Product (VII) of Compound (II) |
| λmax. in water | 528 mμ | 540 mμ |
| Shade on polycerylonitrile fibres | Red | Bluish red |
| Structural formula | Carbamoylethylation Product (IX) of Compound (I) | Carbamoylethylation Product (X) of Compound (II) |
| λmax. in water | 533 mμ | 543 mμ |
| Shade on polyacrylonitrile fibres | Red | Bluish red |
| Structural formula | Methylation Product (XI) of Compound (III) | Methylation Product (XII) of Compound (IV) |
| λmax. in water | 518 mμ | 535 mμ |
| Shade on polyacrylonitrile fibres | Yellowish red | Bluish red | rived therefrom should naturally have either one of the Formulae g and h. It may be concluded taking into consideration of the effect of the steric hindrance of the compounds of Group B upon a quaternizing agent, that there is a probability that the compound (d) will result in the compound (h) according to the known process, while the compound (e) will result in the compound (j) according to the present invention.

The above presumption is reasonably supported by the chemical formulae of the analogous compounds given, for example, in the specification of British Pat. No. 837,471.

At any rate, it is obvious from the above consideration that the triazol monoazo dyestuffs in the form of quaternary ammonium salts of the present invention are new substances that can wholly be distinguished from those disclosed in British Pat. Nos. 837,471 and 791,932.

The intermediate triazol monoazo dyestuffs represented by the Formula 6 which serve as starting materials for the production of the quaternized monoazo dyestuffs according to the present invention may be obtained by coupling a diazotized 3-amino-1-substituted (or 1,5-disubstituted) 1,2,4-triazol in an aqueous medium with an amino compound of the benzene or naphthalene series free from acid radicals which are capable of dissociating in water.

As examples of the amine compounds, there may be used various kinds of compounds conventionally used in the field of azo dyestuffs and preferably those capable of coupling at the paraposition to the amino group. Although the amino group may be a primary or secondary one, a tertiary amino group is preferable. As exemplary substituents for $R_3$ and $R_4$ in said amino group, there may be mentioned, for example, hydrogen, methyl, ethyl, propyl, butyl, $\beta$-hydroxyethyl, $\beta$-cyanoethyl, $\beta$-methoxyethyl, $\beta$-ethoxyethyl, $\beta$-chloroethyl, benzyl, phenyl and 4-ethoxyphenyl and the like.

As the cyclic amino compound of the aforementioned Formula 3, there may be mentioned piperidino, piperazino and morpholino compounds and the like. There may be further mentioned tetrahydroquinolyl compounds such as, for example, 1-butyl-3-oxyl-1,2,3,4-tetrahydroquinoline as the compound of the Formula 4 and also indolynil compounds, such as, for example 1,2-dimethyl indoline as the compound of Formula 5.

As suitable amino compounds such as abovementioned, there may be enumerated, for example, N-(beta-cyanoethyl)-o-chloroaniline,
N-(beta-cyanoethyl)-o-anisidine,
N,N-diethylaniline,
N,N-diethyl-m-toluidine,
N,N-diethyl-m-chloroaniline,
N,N-diethyl-m-anisidine,
N,N-diethyl-N'-acetyl-m-phenylenediamine,
N,N-dimethylaniline,
N,N-di-n-butylaniline,
N,N-dibenzylaniline,
N-ethyl-N-benzylaniline,
N-ethyl-N-(beta-oxyethyl)aniline,
N-ethyl-N-(beta-oxyethyl)-m-toluidine,
N-methyl-N-(beta-chloroethyl)aniline,
N-benzyl-N-(beta-cyanoethyl)aniline,
N,N-bis(beta-cyanoethyl)aniline,
N,N-bis(beta-cyanoethyl)-m-toluidine,
N,N-bis(beta-chloroethyl)-aniline,
N-methyldiphenylamine,
N-ethyl-4-ethoxy-diphenylamine,
1,2-dimethyl-indoline,
1-(beta-cyanoethyl)-2-methylindoline,
N-phenylmorpholine,
1-methyl-1,2,3,4-tetrahydroquinoline,
1-methyl-3-oxy-1,2,3,4-tetrahydroquinoline,
1-butyl-3-oxy-1,2,3,4-tetrahydroquinoline,
1-methyl-3-chloro-1,2,3,4-tetrahydroquinoline and
1-methyl-3-methoxy-1,2,3,4-tetrahydroquinoline and so on.

As exemplary substituent for $R_1$ in the aforementioned triazol compound, there may be mentioned an alkyl containing 1–4 carbons, such as methyl, ethyl, butyl and the like, benzyl and phenyl; and as the substituent for $R_2$ in said triazol compound, there may be mentioned hydrogen, an alkyl containing 1–4 carbon atoms such as methyl, ethyl, butyl and benzyl and phenyl radicals.

For example, the following triazol compounds are preferably employed:

1-methyl-3-amino-1,2,4-triazol,
1-ethyl-3-amino-1,2,4-triazol,
1-benzyl-3-amino-1,2,4-triazol,
1-benzyl-5-methyl-3-amino-1,2,4-triazol,
1-phenyl-3-amino-1,2,4-triazol,
1,5-dimethyl-3-amino-1,2,4-triazol,
1-methyl-5-benzyl-3-amino-1,2,4-triazol,
1-ethyl-5-phenyl-3-amino-1,2,4-triazol,
1,5-diphenyl-3-amino-1,2,4-triazol,
1-phenyl-5-methyl-3-amino-1,2,4-triazol,
1-benzyl-5-phenyl-3-amino-1,2,4-triazol,
1,5-dibenzyl-3-amino-1,2,4-triazol and so forth.

The novel cationic azo dyestuffs of the present invention may be prepared by quaternizing the azo dyestuffs represented by the aforementioned general Formula 6 in accordance with the following two procedures.

In the first procedure, the azo dyestuffs are subjected to reaction with an alkylating agent or benzoyl chloride in an inert organic solvent such as benzene, toluene, xylene, chloroform, carbon tetrachloride, tetrachloroethane, chlorobenzene, o-dichlorobenzene, nitrobenzene, dioxane and dimethyl formamide. Instead of the inert organic solvent, there is used an excess of an alkylating agent or benzyl chloride. As preferable alkylating agent, there may be mentioned esters of inorganic and organic sulfonic acids and alkyl halides. The following are the typical examples of the agents:

Dimethyl sulfate, diethyl sulfate, methyl ester of benzene sulfonic acid; methyl, ethyl and butyl esters of p-toluene sulfonic acid, methyl chloride, methyl bromide, ethyl iodide, ethyl bromide and so forth.

Although the quaternization reaction of the present invention is exothermic, an external heating is required in most cases in order to initiate the reaction. The reaction is advantageously carried out an an elevated temperature.

In the second procedure of the quaternization, the addition of an alpha, beta-unsaturated compound to the intermediate monoazo dyestuff is carried out in a suitable solvent in the presence of a proton yielding substance. Solvents such as ethanol, dimethyl formamide and in particular formic and acetic acids are suitable, because these substances are capable of highly dissolving the intermediate azo dyestuffs. As proton yielding substances, there may be employed not only inorganic acids such as hydrochloric, sulfuric and hydrobromic acids and the like but also organic acids such as glacial acetic acid, benzene and toluene sulfonic acids and so forth.

As examples of alpha, beta-unsaturated compounds, there may be mentioned acrylic amide, methacrylic amide, vinyl methyl ketone, vinyl methyl ether and the like, and acrylic amide is particularly preferable. Although the reaction is exothermic, it is desirabel to heat the reaction system to initiate the reaction.

The resulting quaternary monoazo dyestuffs, if they are insoluble in the inert solvent employed, will settle out. They are recovered easily by filtration. Alternatively, the solvent may be removed from the reaction mixture by means of vacuum distillation or steam distillation. When a solvent is employed which is miscible with water, the resulting dyestuff in the form of quaternary ammonium salt may be separated by salting out from its aqueous solution.

The quaternized cationic monoazo dyestuffs according to the present invention contain in their molecule an anionic radical derived from, for example, hydrochloric, hydrobromic, sulfuric, benzene and/or toluene sulfonic acids as well as monalkyl esters of sulfuric acid. Owing to their strongly basic nature, the colored cationic moiety of the quaternized monoazo dyestuff molecule of the present invention forms the stable salts with anions derived from relatively weak organic acids such as formic, acetic and oxalic acids. In a certain case, hydroxy ion is also embraced in these salt-forming anions. The dyestuff salts can also form a double salts with zinc chloride.

The novel quaternized ammonium monoazo dyestuffs of the present invention, in view of their chemical structure, belong to a class of basic dyestuffs of orange to reddish violet colors and exhibit a good solubility in water. They are adapted for dyeing papers, cellulose fibres pretreated with a mordant such as tar-tar emetic and tannin, acetate fibres, silk, leather and synthetic fibres and particularly those made of polyacrylonitrile and copolymers of acrylonitrile. Particularly, the dyeings on the fibres of polyacrylonitrile and copolymers of acrylonitrile, exhibit excellent dyeing properties.

In most cases, the dyeings thus obtained are highly brilliant in shades and are characterized by a variety of orange colors. This is highly appreciated, because there is a difficulty in production of dyestuffs capable of producing such shades of the dyeings according to the known processes. The dyeings obtained with the novel dyestuffs show excellent fastnesses to light, washing, rubbing, heat and the like.

The different affinities of the dyestuffs of the present invention on these fibrous materials make it possible to provide a variety of satisfactorily controlled dyeings ranging from deep to light colors of level dyeing.

Further characteristics of the dyeings on poly-acrylonitrile fibres obtained with the novel dyestuffs according to the present invention are their good dischargability when treated with stannous chloride. This is surprising, because the dyeings on poly-acrylonitrile fibres obtained with the known similar dyestuffs cannot satisfactorily be discharged by such treatment.

The following examples illustrate the invention but should not be construed as limiting the invention. In the examples, parts and percents are by weight unless otherwise indicated.

EXAMPLE 1

17.4 parts of 1-benzyl-3-amino-1,2,4-triazol were dissolved in 140 parts of a 60% acetic acid. To the solution were added 10 parts of a 98% sulfuric acid, and the whole was cooled to $-2°-0°$ C. At that temperature, 149 parts of nitrosylsulfuric acid prepared with 7.3 parts of sodium nitrite were added drop by drop. The reaction mixture was kept for one hour in the presence of an excess of nitrous acid. After completion of the diazotization, a small amount of urea was added to the reaction mixture to destroy the remaining nitrous acid.

A solution prepared by dissolution of 15.1 parts of N,N-diethylaniline into 180 parts of glacial acetic acid was poured into the above diazotized solution while keeping at a temperature of 0°–2° C., and the whole was stirred for 30 minutes.

117 parts of ammonium acetate were then added in a course of an hour, and stirring was continued for a half an hour to complete the coupling. After the coupling, the whole was poured into 1,500 parts of ice-water. Yellowish orange precipitate separated out was recovered by filtration, washed with water and dried at 70° C.

There was thus obtained a monoazo dyestuff having the formula

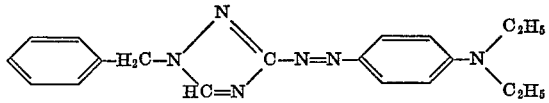

33.6 parts of this dyestuff were dissolved in 160 parts of dimethylformamide. To the solution were added drop by drop 25.2 parts of dimethyl sulfate at a temperature of 90°–95° C. The mixture was agitated at that temperature for additional two hours to complete quaternization. Then the mixture was poured into 1,500 parts of water followed by adding 200 parts of sodium chloride at 80° C. The whole was allowed to cool. The reddish orange precipitate separated out was recovered by filtration and dried at 70° C. There was obtained 36.2 parts of a quaternary ammonium salt of the azo dyestuff, which was soluble in water to yield a red solution. From a weak acid dyebath, the dyestuff produced on acrylonitrile fibres a dyeing of brilliant red shade having considerably excellent fastness properties to light, washing, rubbing and heat. The dyeing was thoroughly discharged when treated with stannous chloride.

An ethylated monoazo dyestuff was obtained by the same procedure as that described in this example except that a corresponding amount of diethyl sulfate or ethyl ester of p-toluene sulfonic acid was substituted for dimethyl sulfate in this example. By using zinc chloride in addition to sodium chloride for salting out of the quaternized monoazo dyestuff, there was obtained a double salt of the dyestuff with zinc chloride.

Other quaternized monoazo dyestuffs having similar dyeing properties were obtained by repeating the same procedure starting from the intermediate monoazo dyestuffs listed in the following Table IV. In table, the "shade" was that of the dyeings on poly-acrylonitrile fibres with the resulting quaternary ammonium salts of the monoazo dyestuffs.

TABLE IV

| Example | Intermediate monoazo dyestuff (parts) | Solvent (parts) | Quaternizing agent (parts) | Shade |
|---|---|---|---|---|
| 2 | (structure, 29.3) | Dimethyl formamide (160). | Dimethyl sulfate (25.2) | Red. |
| 3 | (structure, 37.4) | do | Diethyl sulfate (31.8) | Red. |

TABLE IV—Continued

| Example | Intermediate monoazo dyestuff (parts) | Solvent (parts) | Quaternizing agent (parts) | Shade |
|---|---|---|---|---|
| 4 | [structure] (43.6) | Dimethyl formamide (160). | Dimethyl sulfate (25.2) | Orange. |
| 5 | [structure] (44.2) | Dioxan (150) | do | Do. |
| 6 | [structure] (30.2) | Dimethyl formamide (160). | p-Toluene sulfonic acid methyl ester (37.2). | Red. |
| 7 | [structure] (39.6) | do | Dimethyl sulfate (25.2) | Orange. |
| 8 | [structure] (30.0) | do | do | Red. |
| 9 | [structure] (35.0) | do | p-Toluene sulfonic acid ethyl ester (40.0). | Red. |
| 10 | [structure] (42.5) | do | Dimethyl sulfate (25.2) | Red. |
| 11 | [structure] (39.6) | Dioxan (150) | do | Yellowish red. |
| 12 | [structure] (35.5) | do | Diethyl sulfate (31.8) | Red. |

TABLE IV—Continued

| Example | Intermediate monoazo dyestuff (parts) | Solvent (parts) | Quaternizing agent (parts) | Shade |
|---|---|---|---|---|
| 13 | [structure] (39.8) | Dimethyl formamide (160). | p-Toluene sulfonic acid ethyl ester (40.0). | Orange. |
| 14 | [structure] (37.8) | do | Benzyl chloride (25.3) | Red. |
| 15 | [structure] (36.1) | Dioxan (150) | Dimethyl sulfate (25.2) | Red. |

EXAMPLE 16

9.8 parts of 1-methyl-3-amino-1,2,4-triazol were dissolved in 140 parts of a 60% acetic acid, and 10 parts of a 98% sulfuric acid were added. The whole was cooled to a temperature of $-2°-0°$ C. At this temperature, 149 parts of nitrosyl sulfuric acid prepared from 7.3 parts of sodium nitrite were added drop by drop. By maintaining an excess of nitrous acid in the solution for one hour, the diazotization was performed. The remaining nitrous acid was removed by decomposing it with addition of a small quantity of urea.

Another solution was prepared by dissolving 16.5 parts of N-phenylmorpholine in 180 parts of glacial acetic acid and cooled to $0°-2°$ C., which was then poured into the above diazotization mixture. After agitating the mixture for a half an hour, there were added 117 parts of ammonium acetate during one hour and the agitation was further continued for a half an hour to ensure the coupling. After completion of the coupling, the liquor was poured on 1,500 parts of ice-water. The yellowish orange precipitate was recovered by filtration and washed with water. Upon drying at 70° C., a monoazo dyestuff having the following chemical formula was obtained.

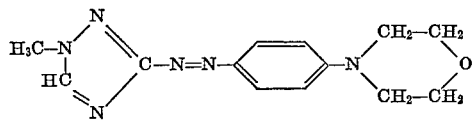

27.2 parts of the above monoazo dyestuff were dissolved in 160 parts of dimethyl formamide. To the solution were added dropwise at a temperature of 90°–95° C. 31.8 parts of diethyl sulfate. At that temperature, the whole was stirred for two hours to complete quaternization. After completion of the quaternization, the mixture was introduced into 1,500 parts of water. 200 parts of sodium chloride were added at 80° C. and the mixture was allowed to cool. The reddish orange precipitate thus separated out was filtered and dried at 70° C. There was obtained 32.2 parts of the quaternary ammonium salt of said monoazo dyestuff. The dyestuff salt was soluble in water to give a red solution. Dyeing on polyacrylonitrile fibres in a brilliant red shade was obtained from a weak acid dyebath. The dyeing possessed excellent fastness properties to light, washing, rubbing and heat. The dyeing was discharged white by treating with stannous chloride.

A methylated quaternary ammonium salt of monoazo dyestuff was obtained by the same procedure as that disclosed in the afore-mentioned example except that an equivalent amount of dimethyl sulfate or p-toluene acid methyl ester was substituted for diethyl sulfate. The resulting quaternary ammonium salt was recovered as its double salt of zinc chloride in addition to sodium chloride.

Two other quaternized monoazo dyestuffs having similar dyeing properties were obtained by repeating the same procedure, starting from the intermediate monoazo dyestuffs listed in Table V below, wherein the "shade" was that of the dyeings on polyacrylonitrile fibres.

TABLE V

| Example | Intermediate monoazo dyestuff (parts) | Solvent (parts) | Quaternizing agent (parts) | Shade |
|---|---|---|---|---|
| 17 | [structure] (36.1) | Dimethyl formamide (160). | Dimethyl sulfate (25.2) | Red. |
| 18 | [structure] (42.3) | do | p-Toluene sulfonic acid methyl ester (37.2). | Red. |

EXAMPLE 19

25 parts of 1-benzyl-3-amino-5-phenyl-1,2,4-triazol were added to 150 parts of a 60% acetic acid and 10 parts of a 98% sulfuric acid were then added at a temperature up to 10° C. The mixture was cooled to −2°–0° C. At this temperature, 145 parts of nitrosylsulfuric acid derived from 7.8 parts of sodium nitrite were added dropwise to the mixture.

Diazotization of the mixture was carried out by maintaining therein an excess of the nitrous acid for one hour.

Another solution was prepared by dissolving 21.6 parts of 1-butyl-3-oxy-1,2,3,4-tetrahydroquinoline in 180 parts of glacial acetic acid. The solution was then added to the above diazotized solution while keeping the temperature at 0° C. to 2° C. After stirring for a half an hour, 117 parts of ammonium acetate were added to the mixture during an hour. The coupling was performed by further stirring for a half an hour. The whole was then poured into 1,500 parts of ice-water, and the resulting yellowish orange precipitate was recovered by filtration, washed with water and dried at 70° C. There was obtained a monoazo dyestuff having the following chemical formula

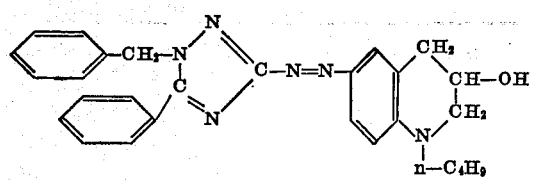

46.2 parts of the above monoazo dyestuff were dissolved in 277 parts of dimethyl formamide. To the solution were added dorpwise at 90°–95° C. 25.2 parts of dimethyl sulfate. At the same temperature, the mixture was stirred for two hours to complete the quaternization. The quaternized solution was then introduced into 1,500 parts of water, and 200 parts of sodium chloride were added at 80° C. The mixture was allowed to cool. A red precipitate separated out which was recovered by filtration and dried at 70° C. There were thus obtained 46.2 parts of the quaternary ammonium salt of the said monoazo dyestuff, which was soluble in water to give a red solution. The dyestuff salt produced a dyeing of bright red shade on polyacrylonitrile fibers from a weak acid dyebath. The dyeing exhibited excellent fastness properties to light, washing, rubbing and heat. The dyeing was completely discharged white when it was treated with stannous chloride.

Another ethylated quaternary ammonium salt of the aforementioned monoazo dyestuff was obtained by the same procedure as that disclosed in the afore-mentioned example except that an equivalent amount of diethyl sulfate or p-toluene sulfonic acid ethyl ester was substituted for dimethyl sulfate as the quaternizing agent.

Furthermore, a zinc chloride double salt of said quaternary ammonium salt of the dyestuff was obtained by salting out the resulting dyestuff salt with zinc chloride along with sodium chloride.

A variety of the quaternary ammonium salts of the monoazo dyestuffs having similar dyeing properties to those of the afore-mentioned example were prepared in a similar manner starting from the intermediate monoazo dyestuffs listed in the following Table VI. In table, "shade" was that of the dyeings on polyacrylonitrile fibres.

TABLE VI

| Example | Intermediate monoazo dyestuff (parts) | Solvent (parts) | Quaternizing agent (parts) | Shade |
|---|---|---|---|---|
| 20 | (36.2) | Dimethyl formamide (160). | Dimethyl sulfate (25.2) | Red. |
| 21 | (34.8) | do | Diethyl sulfate (31.8) | Red. |
| 22 | (40.8) | do | Dimethyl sulfate (25.2) | Bluish red. |
| 23 | (44.2) | do | p-Toluene sulfonic acid methyl ester (37.2). | Red. |

TABLE VI—Continued

| Example | Intermediate monoazo dyestuff (parts) | Solvent (parts) | Quaternizing agent (parts) | Shade |
|---|---|---|---|---|
| 24 | (structure) (43.8) | Dimethyl formamide (160). | Dimethyl sulfate (25.2) | Red. |
| 25 | (structure) (40.8) | ......do...... | Diethyl sulfate (31.8) | Bluish red. |

EXAMPLE 26

18.6 parts of 1-benzyl-5-methyl-3-amino-1,2,4-triazol were dissolved in 130 parts of an 80% acetic acid. 10 parts of a 98% sulfuric acid were added thereto and the solution was cooled to −2°–0° C. At this temperature, 149 parts of nitrosylsulfuric acid derived from 7.3 parts of sodium nitrite were added dropwise. The diazotization was carried out by maintaining an excess of nitrous acid in the solution for one hour. The unreacted nitrous acid was then decomposed with a small amount of urea.

Another solution was prepared by dissolving 18.8 parts of N-methyl-diphenylamine in 100 parts of glacial acetic acid. The solution was then added to the above-mentioned diazotized solution at a temperature of 0°–2° C. After stirring for a half an hour, 125 parts of sodium acetate were added to the mixture during one hour, and stirred for an additional half an hour to complete the coupling. The whole was then poured into 1,500 parts of ice-water. The yellowish orange precipitate separated out was recovered by filtration, washed with water and dried at 70° C. There was obtained a monoazo dyestuff having the following chemical formula

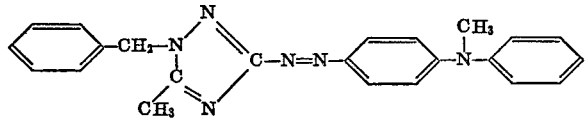

38.2 parts of the above monoazo dyestuff were dissolved in 200 parts of glacial acetic acid. To the solution were added at 90°–95° C. 10.6 parts of a 36% hydrochloric acid and then 71.1 parts of acrylamide. The whole was stirred at that temperature for 4 hours to ensure a perfect quaternization. The reaction mixture was poured into 1,500 parts of water. A small amount of activated charcoal was added and the whole was stirred and filtered. The resulting dyestuff salt was salted out from the filtrate as a reddish orange precipitate by adding 15.2 parts of zinc chloride and 200 parts of sodium chloride, recovered by filtration and dried at 70° C.

There was obtained 42.3 parts of a quaternary ammonium salt of the afore-mentioned monoazo dyestuff.

The dyestuff salt thus obtained was soluble in water to give a red solution. A brilliant red dyeing on polyacrylonitrile fibres from a weak acid dyebath exhibited excellent fastness properties to light, washing, rubbing, heat and so forth. The dyeing was thoroughly discharged by treating it with stannous chloride.

A series of the quaternary ammonium salts of the monoazo dyestuffs having similar dyeing properties to those of the afore-mentioned example were prepared in the same manner starting from the intermediate monoazo dyestuffs listed in the following Table VII. In the table, "shade" was that of the dyeings on polyacrylonitrile fibres.

TABLE VII

| Example | Intermediate monoazo dyestuff (parts) | Solvent (parts) | Quaternizing agent (parts) | Shade |
|---|---|---|---|---|
| 27 | (structure) (28.9) | Glacial acetic acid (200). | Acrylamide (71.1), hydrobromic acid (21.2). | Red. |
| 28 | (structure) (32.1) | ......do...... | Vinyl methyl ketone (70.1), hydrochloric acid (10.6). | Red. |
| 29 | (structure) (35.6) | ......do...... | Acrylamide (71.1), hydrochloric acid (10.6). | Reddish violet. |

TABLE VII—Continued

| Example | Intermediate monoazo dyestuff (parts) | Solvent (parts) | Quaternizing agent (parts) | Shade |
|---|---|---|---|---|
| 30 | 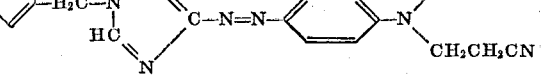 (38.4) | Glacial acetic acid (200). | Vinyl methyl ether (58.1), p-toluene sulfonic acid (18.0). | Orange. |
| 31 |  (42.7) | ......do........ | Acrylamide (71.1), hydrochloric acid (10.6). | Red. |
| 32 | 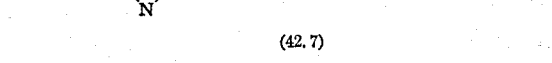 (45.3) | ......do........ | Methacrylamide (85.1), hydrochloric acid (10.6). | Bluish red. |
| 33 | 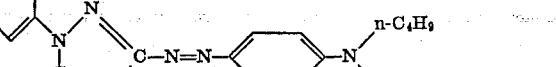 (40.4) | ......do........ | Acrylamide (71.1), p-toluene sulfonic acid (18.0). | Red. |
| 34 |  (39.1) | ......do........ | ......do........ | Red. |
| 35 | 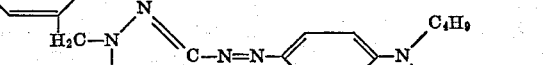 (31.8) | ......do........ | Acrylamide (71.1), hydrochloric acid (10.6). | Red. |

EXAMPLE 36

33.6 parts of the intermediate monoazo dyestuff same as that employed in Example 1 were heated with a solution of 32.7 parts of ethyl bromide in 200 parts of ethyl alcohol under pressure to a temperature of 100°–120° C. for 5 hours. Most of the solvent was then distilled off under reduced pressure. The residue was crystallized from water to obtain 37.0 parts of the resulting quaternary ammonium salt of the monoazo dyestuff.

The dyestuff salt thus obtained was soluble in water to yield a red solution.

A red dyeing on polyacrylonitrile fibres obtained from a weak acid dyebath showed good fastness properties to light, washing, rubbing and heat. The dyeing was completely discharged by treating with stannous chloride.

By using a corresponding amount of methyl bromide, methyl iodide and benzyl chloride for ethyl bromide in this example, the respective quaternary ammonium salts of the dyestuff having similar dyeing properties were obtained.

EXAMPLE 37

To 38.2 parts of the intermediate monoazo dystuff employed in Example 26 were added 400 parts by volume of chloroform and 25.2 parts of dimethyl sulfate. The whole was refluxed with stirring for 5 hours to complete quaternization. The reaction mixture was subjected to distillation in order to remove most of the chloroform. The residue was dissolved under heat in a mixture of 12 parts of a 36% hydrochloric acid and 1,500 parts of water, shaken with a small amount of activated charcoal and filtered. 200 parts of sodium chloride were added to the filtrate to salting out a reddish orange precipitate, which was recovered by filtration and dried at 70° C. under reduced pressure. There was thus obtained 40.4 parts of a quaternary ammonium salt of the dyestuff, which was soluble in water to give a red solution.

From a weak acid dyebath of said dyestuff salt, polyacrylonitrile fibers were dyed in a brilliant red shade having excellent fastness properties to light, washing, rubbing and heat. The dyeing was completely discharged by the treatment with stannous chloride.

By using an equivalent amount of diethyl sulfate or p-toluene sulfonic acid ethyl ester instead of dimethyl sulfate as the quaternizing agent in this example, there was obtain the correspondingly ethylated dyestuff salt.

A series of the quaternary ammonium salts of the monoazo dyestuffs having similar shades and dyeing properties were obtained by carrying out the same procedure as that described in the above example, starting from the intermediate monoazo dyestuffs listed in Table VIII below. In table, "shade" was that of the dyeings on polyacrylonitrile fibres.

TABLE VIII

| Example | Intermediate monoazo dyestuff (parts) | Solvent (parts) | Quaternizing agent (parts) | Shade |
|---|---|---|---|---|
| 38 | (structure) (30.8) | Chloroform (400). | Dimethyl sulfate (25.2) | Red. |
| 39 | (structure) (37.2) | Benzene (400) | Diethyl sulfate (31.8) | Red. |
| 40 | (structure) (40.3) | Dichlorobenzene (400). | p-Toluene sulfonic acid ethyl ester (37.2). | Red. |
| 41 | (structure) (36.2) | Carbon tetrachloride (300). | Dimethyl sulfate (25.2) | Red. |
| 42 | (structure) (36.9) | Chloroform (400). | ...do... | Red. |
| 43 | (structure) (41.1) | Chlorobenzene (400). | ...do... | Red. |
| 44 | (structure) (42.9) | Benzene (400) | ...do... | Red. |
| 45 | (structure) (34.6) | ...do... | ...do... | Bluish red. |

TABLE VIII—Continued

| Example | Intermediate monoazo dyestuff (parts) | Solvent (parts) | Quaternizing agent (parts) | Shade |
|---|---|---|---|---|
| 46 | (structure) (37.6) | Benzene (400) | do | Do. |
| 47 | (structure) (36.2) | Chlorobenzene (400) | do | Red. |
| 48 | (structure) (43.5) | do | do | Orange. |
| 49 | (structure) (40.1) | Benzene (400) | do | Red. |

The triazol amino compounds employed as azo component for the production of the intermediate monoazo dyestuffs that are subjected to quaternization according to the present invention are prepared, for example, by the following referential examples.

REFERENTIAL EXAMPLE A

Preparation of 1-benzyl-3-amino-1,2,4-triazol 40 parts of 1-benzylaminoguanidine hydrochloride melting at 146°–147° C. were added to 60 parts of an 80% formic acid. The mixture was stirred under reflux at 103° C. for one hour. The unreacted formic acid was then removed from the reaction mixture by distilling off under reduced pressure. White crystalline mass separated out was dissolved in 40 parts of water and the solution was made alkaline with a 45% aqueous sodium hydroxide solution.

The white crystalline substance separated out was recovered by filtration and recrystallized from 160 parts of water. 28.2 parts of 1-benzyl-3-amino-1,2,4-triazol having a melting point of 133°–134° C. were thus obtained.

Other corresponding triazol compounds given in the following Table IX were obtained by repeating the same procedure as in the above referential Example A starting from the substituted aminoguanidines and organic acids.

TABLE IX

| Substituted aminoguanidine (parts) | Organic acid (parts) | Triazol compound (yield: parts) |
|---|---|---|
| CH$_3$NHNHC(=NH)NH$_2$·HCl (12.4) | HCOOH (4.6) | CH$_3$-N-C / HC=N (8.8) |
| C$_2$H$_5$NHNHC(=NH)NH$_2$·HCl (13.9) | HCOOH (4.6) | H$_5$C$_2$-N-C-NH$_2$ / H-C=N (10.1) |
| C$_6$H$_5$NHNHC(=NH)NH$_2$·HCl (18.6) | HCOOH (4.6) | C$_6$H$_5$-N-C-NH$_2$ / H-C=N (14.4) |

TABLE IX—Continued

| Substituted aminoguanidine (parts) | Organic acid (parts) | Triazol compound (yield: parts) |
|---|---|---|
| CH$_3$NHNHC(=NH)NH$_2$ · HCl (12.4) | C$_6$H$_5$-CH$_2$COOH (13.6) | 1-methyl-3-amino-5-benzyl-1,2,4-triazol (16.7) |
| C$_6$H$_5$-CH$_2$NHNHC(=NH)NH$_2$ · HCl (20.0) | C$_6$H$_5$-CH$_2$COOH (13.6) | 1-benzyl-3-amino-5-benzyl-1,2,4-triazol (23.6) |

In the same manner as afore-mentioned, the following triazol compounds were also obtained.

TABLE X

| Substituted aminoguanidine (parts) | Organic acid (parts) | Triazol compound (yield: parts) |
|---|---|---|
| CH$_3$NHNHC(=NH)NH$_2$ · HCl (12.4) | CH$_3$COOH (6); (CH$_3$CO)$_2$O (10) | 1,5-dimethyl-3-amino-1,2,4-triazol (10.1) |
| C$_6$H$_5$-NHNHC(=NH)NH$_2$ · HCl (18.6) | CH$_3$COOH (6); (CH$_3$CO)$_2$O (10) | 1-phenyl-5-methyl-3-amino-1,2,4-triazol (15.6) |

REFERENTIAL EXAMPLE B

Preparation of 1-benzyl-5-methyl-3-amino-1,2,4-triazol 20 parts of 1-benzylaminoguanidine hydrochloride having a melting point of 146°–147° C. were dissolved in a mixture of 6 parts of glacial acetic acid and 10 parts of acetic anhydride with stirring at 70°–80° C. Acetylation was then carried out at 80°–90° C. for 2½ hours. Upon cooling to a room temperature, 40 parts of water were added to the reaction mixture. 25 parts of a 48% aqueous sodium hydroxide solution were then added to the mixture with stirring at 50°–60° C., and a ring closure reaction was caused by maintaining the alkalinity of the mixture at 95°–100° C. for one hour. The reaction mixture was cooled to a room temperature. The white crystals were recovered by filtration, washed with water and dried at 70° C.

18.1 parts of 1-benzyl-5-methyl-3-amino-1,2,4-triazol having a melting point of 169°–170° C. were thus obtained.

REFERENTIAL EXAMPLE C

Preparation of 1-benzyl-5-phenyl-3-amino-1,2,4-triazol 20 parts of 1-benzylaminoguanidine hydrochloride melting at 146°–147° C. were added with stirring to 40 parts of chlorobenzene at a room temperature and followed by addition of 14 parts of benzoyl chloride. The whole was heated to 110°–120° C. until evolution of the hydrogen chloride ceased. 200 parts of water were added to the reaction mixture and chlorobenzene was removed from the mixture by steam distillation.

8.3 parts of a 48% aqueous sodium hydroxide solution at 60°–70° C. were added to the mixture to bring its pH to a value of 12–14. The whole was heated to boil with stirring for 2 hours. Upon cooling to a room temperature, a white crystalline mass was recovered by filtration, washed with water and dried. There were thus obtained 23.4 parts of 1-benzyl-5-phenyl-3-amino-1,2,4-triazol having a melting point of 140°–141° C.

In the same manner as that aforementioned, there were obtained further triazol compounds given in Table XI.

TABLE XI

| Substituted aminoguanidine (parts) | Benzoyl chloride (parts) | Triazol compound (yield: parts) |
|---|---|---|
| H$_5$C$_2$NHNHC(=NH)NH$_2$ · HCl (13.9) | C$_6$H$_5$-COCl (14.0) | 1-ethyl-5-phenyl-3-amino-1,2,4-triazol (16.9) |
| C$_6$H$_5$-NHNHC(=NH)NH$_2$ · HCl (18.6) | C$_6$H$_5$-COCl (14.0) | 1,5-diphenyl-3-amino-1,2,4-triazol (21.2) |

What we claim is:

1. A basic monoazo dyestuff of the following formula:

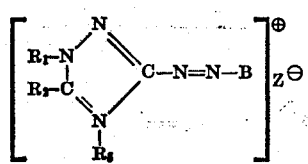

wherein $R_1$ is a member selected from the group consisting of lower alkyl benzyl and phenyl, $R_2$ is a member selected from the group consisting of hydrogen, lower alkyl benzyl and phenyl; $R_5$ is a member selected from the group consisting of a lower alkyl, benzyl, carbamoyl-ethyl, carbamoyl-isopropyl, lower alkoxy-ethyl and lower alkylcarbonylethyl, and B is a member selected from the group consisting of (i)

wherein A is phenyl or naphthyl or phenyl substituted by a member selected from the group consisting of lower alkyl, lower alkoxy, meta-acetylamino and ortho- or meta-chlorine, and $R_3$ and $R_4$ are each a member selected from the group consisting of hydrogen, lower alkyl, beta-oxyethyl, beta-cyanoethyl, beta-chloroethyl, beta-methoxyethyl, beta-ethoxyethyl, benzyl, phenyl and 4-ethoxyphenyl;

(ii)

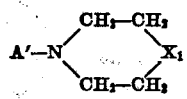

wherein A' is phenyl and $X_1$ is a member selected from the group consisting of oxygen, imino and methylene;

(iii)

wherein Y is lower alkyl and $X_2$ is a member selected from the group consisting of hydrogen, hydroxy, methoxy and chlorine and (iv)

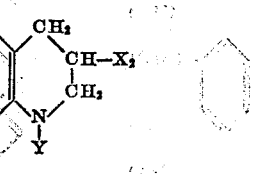

wherein Y is a member selected from the group consisting of a lower alkyl and beta-cyanoethyl, $X_3$ is methyl and $Z^\ominus$ is an anion.

2. The basic monoazo dyestuff of the formula

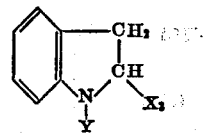

3. The basic monoazo dyestuff of the formula

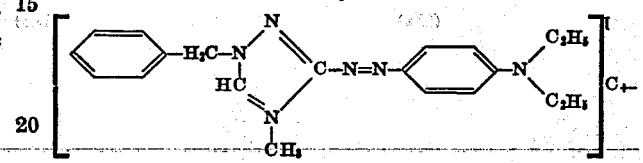

4. The basic monoazo dyestuff of the formula

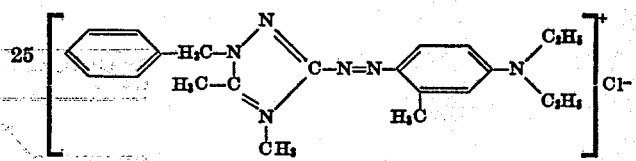

5. The basic monoazo dyestuff of the formula

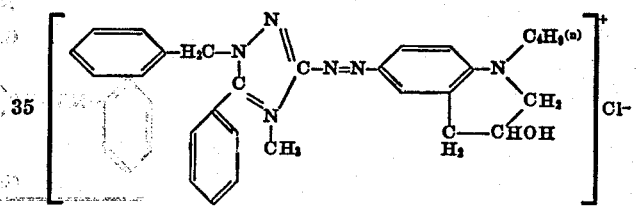

6. The basic monoazo dyestuff of the formula

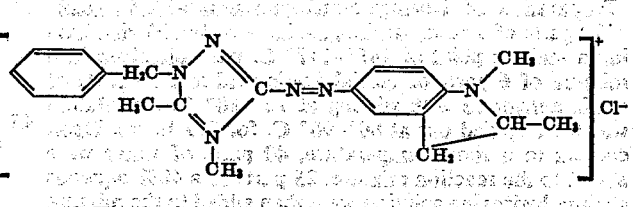

7. The basic monoazo dyestuff of the formula

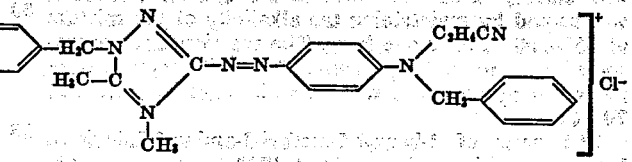

8. The basic monoazo dyestuff of the formula

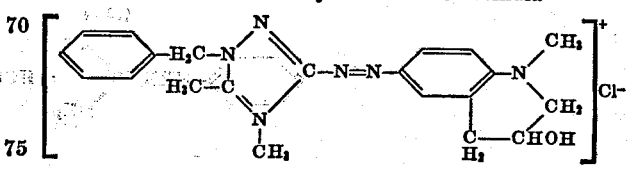

9. The basic monoazo dyestuff of the formula
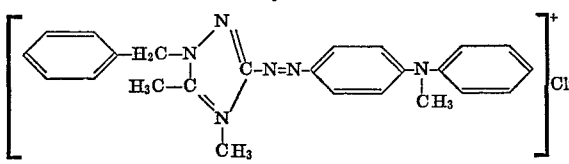
10. The basic monoazo dyestuff of the formula
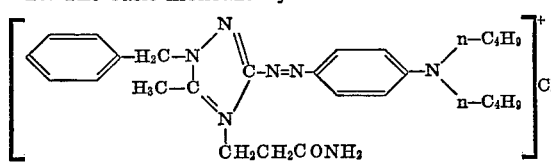
11. The basic monoazo dyestuff of the formula
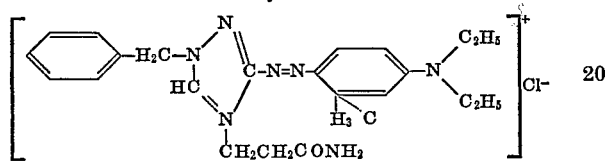
References Cited
UNITED STATES PATENTS
| | | | |
|---|---|---|---|
| 3,078,137 | 2/1963 | Baumonn et al. | 260—157 X |
| 3,101,988 | 8/1963 | Bossard et al. | 260—157 X |
| 3,102,878 | 9/1963 | Baumann et al. | 260—157 X |
| 3,148,935 | 9/1964 | Pfitzner et al. | 260—157 X |
| 3,438,963 | 4/1969 | Robbins | 260—157 |
FLOYD DALE HIGEL, Primary Examiner
U.S. Cl. X.R.
260—146 R, 154, 155, 308 R